United States Patent [19]
Inada

[11] 3,829,169
[45] Aug. 13, 1974

[54] ANTI-SKID BRAKE CONTROL SYSTEM FOR VEHICLES
[75] Inventor: Masami Inada, Tokyo, Japan
[73] Assignee: Aisin Seiki Kabushiki Kaisha, Kariya, Japan
[22] Filed: May 4, 1973
[21] Appl. No.: 357,168

[30] Foreign Application Priority Data
May 5, 1972 Japan............................ 47-44425

[52] U.S. Cl......... 303/21 F, 188/181 A, 303/21 AF
[51] Int. Cl............................................. B60t 8/12
[58] Field of Search.......... 303/21 F, 21 AF, 21 BE, 303/61-63, 68-69, 10; 188/181 A

[56] References Cited
UNITED STATES PATENTS

| | | | |
|---|---|---|---|
| 3,398,995 | 8/1968 | Martin | 303/21 BE |
| 3,414,336 | 12/1968 | Atkin et al. | 303/21 F |
| 3,512,844 | 5/1970 | Stelzer | 188/181 A |
| 3,516,715 | 6/1970 | Fielek, Jr. et al. | 303/61 |
| 3,602,554 | 8/1971 | Ichimura et al. | 303/21 F |
| 3,606,491 | 9/1971 | Walsh | 303/21 AF |
| 3,650,574 | 12/1969 | Okamoto et al. | 303/21 F |
| 3,684,328 | 8/1972 | Koivunen | 303/21 AF |

Primary Examiner—Duane A. Reger
Attorney, Agent, or Firm—Oblon, Fisher, Spivak, McClelland & Maier

[57] ABSTRACT

Anti-skid brake control system for vehicles including a hydraulic braking circuit and anti-skid actuator driven by pump powered hydraulic pressure for controlling the braking pressure in response to an electric signal indicating a wheel rotational condition. The actuator includes a cut off valve for ON-OFF controlling of the braking circuit, a hydraulic pressure reducing piston operatively connected to the cut off valve for reducing the hydraulic brake pressure of the circuit, and an electro-magnetic valve which is actuated to change over the pump powered hydraulic pressure in response to the skid sensing signal whereby, the actuator includes a further electro-magnetic valve which is to be actuated as a safety valve in case the skid sensing signal is generated for an extended period of time such that the normal braking operation might be in danger of a no-braking condition.

3 Claims, 2 Drawing Figures

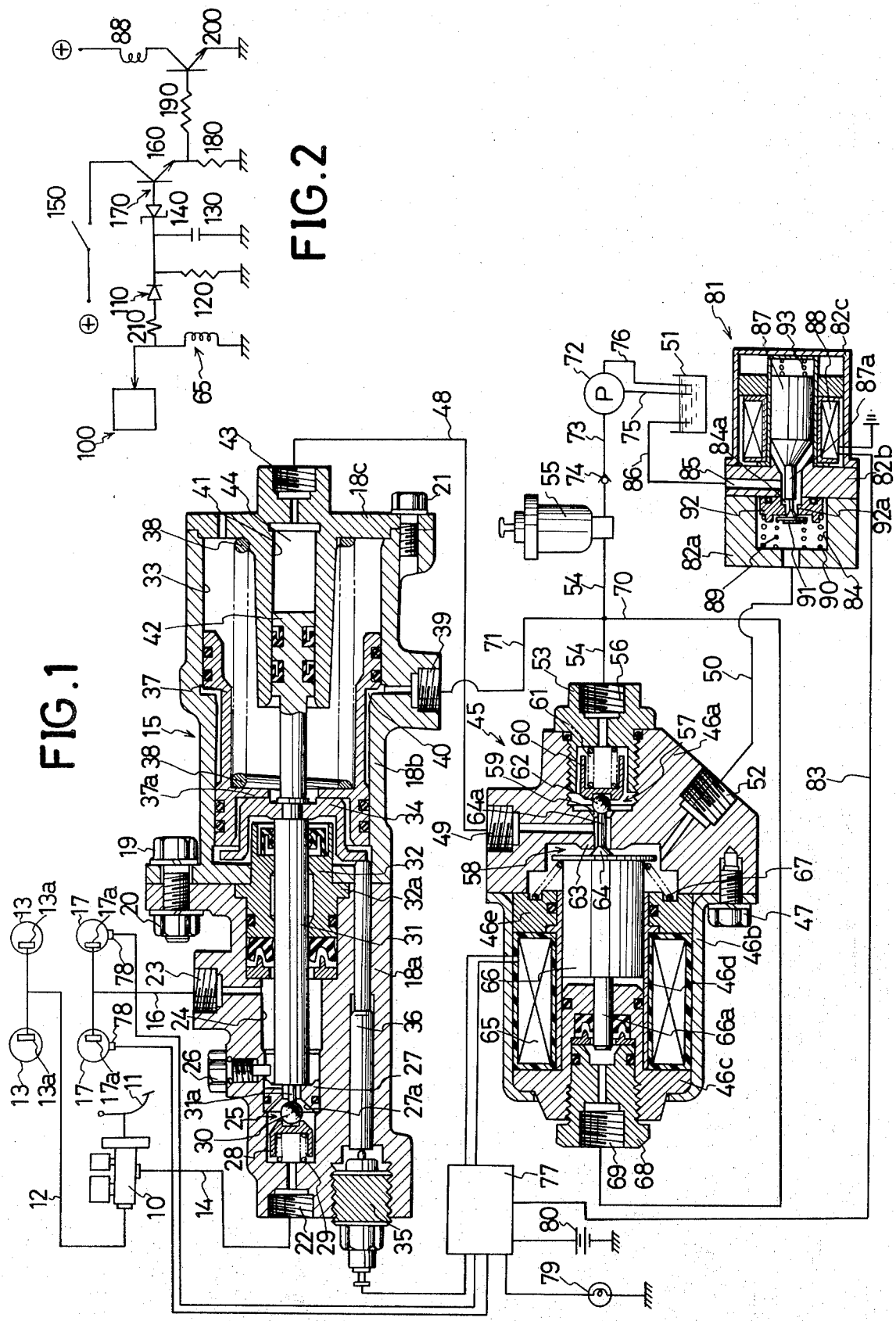

3,829,169

ANTI-SKID BRAKE CONTROL SYSTEM FOR VEHICLES

BACKGROUND OF THE INVENTION

1. Field of the Invention:

This invention relates generally to anti-skid brake control systems, and more particularly to an anti-skid brake control system having a pump powered hydraulic actuator which is actuated to control the braking pressure in response to an electric signal (skid signal) indicating a wheel rotational condition by using an electro-magnetic change-over valve assembly.

2. Description of the Prior Art:

The conventional system of this type has such drawbacks that when the electro-magnetic change-over valve is excited for an extended period of time in response to the electric skid signal, the braking pressure might be reduced to such a degree that the normal braking operation could not be performed.

SUMMARY OF THE INVENTION

It is therefore an object of the invention to provide an improved anti-skid brake control system for obviating the above conventional drawback.

It is another object of the present invention to provide an improved anti-skid brake control system which includes a safety device actuable in the event that a skid sensing signal is generated for an extended period of time such that normal braking operations might be in danger of a no-braking condition.

Briefly, in accordance with one embodiment of this invention, these and other objects are obtained by providing an improved anti-skid brake control system in which a hydraulic anti-skid actuator has a cut off valve, a pressure reducing piston and first and second electro-magnetically actuated valves the first of which is actuated in response to the wheel skid condition and the second of which is actuated in case the first electro-magnetic valve is actuated over a predetermined time such that normal braking operation can be compensated under the anti-skid operation.

BRIEF DESCRIPTION OF THE DRAWINGS

Other objects and advantages of the invention will become more apparent during the following description taken in conjunction with the accompanying drawing wherein:

FIG. 1 is a schematic view of an anti-skid brake control system constructed according to the invention and illustrating the components thereof as they are under non-operation condition.

FIG. 2 is a schematic diagram of an electric circuit associated with the anti-skid brake control system of FIG. 1.

DETAILED DESCRIPTION OF THE INVENTION

In a system according to the invention as shown in FIGS. 1 and 2, numeral 10 denotes a tandem type master cylinder operatively connected to a brake pedal 11. When the brake pedal 11 is applied, the hydraulic brake pressure responsive to the force of said pedal 11 is generated in the master cylinder 10. This hydraulic brake pressure is on one hand supplied to a pair of front wheel brake cylinders 13a, 13a of a pair of front wheels 13, 13 through a conduit 12 and on the other hand supplied to a pair of rear wheel brake cylinders 17a, 17a of a pair of rear wheels 17, 17 through a conduit 14, an actuator 15 and a conduit 16. The actuator 15 is divided into a first housing 18a, a second housing 18b and a third housing 18c. The first and second housings 18a, 18b are rigidly connected to each other by bolts 19 and nuts 20, only a pair of the assembly being shown in FIG. 1, while the third housing 18c is rigidly connected to the housing 18b by bolts 21. The first housing 18a is provided with a first port 22 connected to the conduit 14, a second port 23 connected to the conduit 16 and a first stepped cylinder 24 which places the first port 22 in communication with the second port 23. A valve assembly 25 is disposed within the first stepped cylinder 24 of the first housing 18a for controlling fluid communication between the two ports 22 and 23. The valve assembly 25 consists of a valve seat 27 which is secured to the first housing 18a between a bolt 26 and a stepped portion of the stepped cylinder 24, and a ball valve 30 which is normally biased toward a conical surface 27a of the valve seat 27 by a spring 29 is disposed between a valve retainer 28 and the inside wall of the first housing 18a. A first piston 31 is disposed adjacent to the valve assembly 25 in the stepped cylinder 24 and is reciprocable therewithin by a guide member 32 which is at a flanged portion 32a secured to the first and second housings 18a, 18b. With the left end of the first piston 31 is provided a projection 31a which passes through the valve seat 27 to be in contact with the ball valve 30. Therefore, the ball valve 30 can be either in contact with or detachable from the conical surface 27a of the valve seat 27 by reciprocation of the first piston 31 and the biasing force of the spring 29. The right end portion of the first portion 31 is in engagement with a switch member 34 and co-operatively connected thereto. Switch member 34 is provided within a second stepped cylinder 33 which is formed on the interior of the second housing 18b. A switch body 35 is threaded into the first housing 18a and electrically connected to a computer means 77. A reciprocable rod 36 mounted in the first housing 18a is at the left end thereof operatively connected to the switch member 34. A second stepped piston 37 is reciprocably disposed within the second stepped cylinder 33 of the second housing 18b and is provided with a flange portion 37a. A spring 38 is disposed between the flange portion 37a of the second stepped piston 37 and an inner wall of the third housing 18c within the second stepped cylinder 33, and biases the second piston 37 in the left direction as is shown in FIG. 1. Between the periphery of the second piston 37 and the second cylinder 33 of the second housing 18b is formed a hydraulic chamber 40 which is in communication with an electro-magnetic valve assembly 45 via a third port 39 provided in the second housing 18b, and a conduit 71.

The biasing force of the spring 38 is selected to be sufficiently strong to allow the first piston 31 to move toward the left and open valve assembly 25 against the normal hydraulic braking pressure during normal braking operation in case there is no hydraulic pressure in the chamber 40. However, when the pressurized hydraulic fluid from a pump 72, which is for example, driven by an engine, not shown, is supplied to the chamber 40 via the third port 39, the second piston 37 is moved to the right against the biasing force of the spring 38. In the inwardly projecting portion of the third housing 18c is provided a third cylinder 41 in which a third piston 42 is slidably and sealingly mounted. A fluid chamber 44 is formed between the third piston 42 and the inside wall of the third housing 18c within the third cylinder 41. A fourth port 43 is provided with the third housing 18c which communicates the fluid chamber 44 with the electro-magnetic valve assembly 45 via a conduit 48.

The electro-magnetic valve assembly 45 includes a first housing 46a, a second housing 46b secured thereto by bolts 47, and third, fourth and fifth housings 46c, 46d and 46e all of which are disposed within the second housing 46b. The first housing 46a is formed with a port 49 to which the conduit 48 is connected and a port 52 to which a conduit 50 in communication with a reservoir 51 via a further electro-magnetic valve assembly 81 is connected. A plug body 53 is threaded into the first housing 46a and formed with a port 56 to which a conduit 54 is connected. Within the first housing 46a is disposed a first valve assembly 57 which serves to make selective communication between the two ports 49 and 56 and a second valve assembly 58 which serves to make selective communication between the two ports 49 and 52. The first valve assembly 57 includes a valve seat surface 59 formed in the first housing 46a and a ball valve 62 which is held by a retainer 60 and a spring 61 provided between the retainer 60 and the plug body 53.

A second valve assembly 58 includes a valve seat 63 provided in the first housing 46a and a semi-spherical valve body 64. This valve body 64 has a rod 64a which separates the ball valve 62 from the valve seat surface 59 when the valve body 64 is seated on the valve seat 63 by the force of a spring 67. Between the second housing 46b and the fourth housing 46d is provided a solenoid coil 65. An axially reciprocable plunger 66 is provided in the fourth housing 46d and is biased to be urged rightward by the spring 67 which is disposed between the fourth and first housings 46d and 46a. When no electric current flows in the solenoid 65, the plunger 66 is in contact with the valve body 64 to close the second valve assembly 58. The third housing 46c slidably and sealingly supports a small diameter portion 66a of the plunger 66. A plug body 68 is threaded into the third housing 46c and formed with a port 69 to which a conduit 70 is connected. The small diameter portion 66a of the plunger 66 is at the left end thereof exposed to the port 69.

The diameter of the portion 66a of the plunger 66 is selectively determined to be the same as that of the opening in which the second valve assembly 58 is sealed.

A pump 72 driven by the engine, not shown, is in communication with an accumulator 55 through a check valve 74 by a conduit 73 and also is in communication with the reservoir 51 by conduits 75 and 76, whereby the accumulator 55 stores therein the hydraulic pressure as required. The computer means 77 is electrically connected to sensors 78, 78 which detect the rotation of rear wheels 17, 17 and also is electrically connected to the solenoid coil 65 of the electromagnetic valve assembly 45, such that electric current flows into the solenoid coil 65 when the rear wheels 17, 17 are likely to be locked. Numeral 79 denotes an alarming lamp which is also electrically connected to the computer means and positioned at a suitable place of the vehicle, not shown, and is to be lit when the switch body 35 is separated from the switch member 34 for an excessive period of time. Numeral 80 is a conventional vehicle battery. The second electro-magnetic valve assembly 81, which is divided into three housings 82a, 82b and 82c, is hydraulically connected with the first electro-magnetic valve assembly 45 via the conduit 50 and is also connected with the reservoir 51 via a conduit 86. A hydraulic chamber 84 is provided within the housing 82a. A valve head 91 and a valve seat 92 are disposed within the chamber 84 and are normally biased towards the right in FIG. 1 respectively by springs 89 and 90. Chamber 84 is in communication with the port 52 of the first electro-magnetic valve assembly 45 via the conduit 50. A vertical bore 85 provided in the housing 82b is in communication with the reservoir 51 via the conduit 86 and is also in communication with a passage 84a provided between the two housings 81a and 82b.

Provided within the housing 82c is a solenoid coil 88 which is electrically connected to the computer means 77 via conductor 83. A plunger 87 is reciprocably disposed within said housing 82c and has a projection portion 87a which is normally in contact with the valve head 91. A spring 93 is disposed between the right end of the plunger 87 and the housing 82c and slightly biases the plunger 87 toward the left.

The valve head 91 is slightly separated from a flange 92a of the valve seat 92 due to the biasing force of the spring 93 against that of the spring 89. When the solenoid coil 88 is actuated to move the plunger 87 to the right, the valve head 91 makes contact with the flange 92a to interrupt the fluid communication between the chamber 84 and the vertical bore 85. When the solenoid coil 88 ceases to be actuated, the plunger 87 is moved to the left, first separating the valve head 92 from the flange 92a of the valve seat. Further movement of the plunger 87 causes contact of the flange 92a of the valve seat 92 with the projection 87a of the plunger 87, whereby the fluid communication between the chamber 84 and the reservoir 51 can be restored in two steps.

In FIG. 2, numeral 100 denotes a main circuit of the computer means 77 and generates a skid indicating signal. This main circuit 100 is connected to a condensor 130 via a diode 110 and a resistor 120. The solenoid coil 65 of the electro-magnetic valve assembly 45 is connected to the main circuit 100 and is excited in response to the skid signal. Numeral 150 denotes a switch cooperatively connected to the brake pedal 11 and in the turned ON position according to the stepping operation of the pedal. Resistors 210 and 120 and a condensor 230 form a well known integram circuit or a delay circuit and increase a cathode voltage of a Zener diode 140 proportionately with the exciting time of the solenoid coil 65. Therefore, when the voltage condensed in the condensor 130 exceeds a predetermined value, the Zener diode 140 is on and impresses the voltage in a base 170 of a PNP transistor 160. Thus, the solenoid coil of the second electromagnetic valve assembly 81 can be actuated a predetermined time after the beginning of the actuation of the solenoid coil 65 of the first electro-magnetic valve assembly. Numerals 180 and 190 denote resistors and numeral 200 denotes another PNP transistor.

The operation of the present system constructed as described above is as follows.

First, when the hydraulic pressure is stored in the accumulator 55 by means of the pump 72 and the brake pedal 11 is released, the front wheels 13, 13 as well as the rear wheels 17, 17 are in normal rotation, so that the computer means 77 will not cause current to flow into the solenoid coils 65 and 88, i.e., the switch 150 in FIG. 2 is not actuated. When the brake pedal 11 is stepped on under this condition, braking pressure responsive to the stepping force of the pedal is supplied to the front and rear wheel brake cylinders 13a, 13a; 17a, 17a through master cylinder 10, conduits 12 and 14 and thus, the effective braking operation can be performed.

When the stepping force of the brake pedal is excessively great or the value of the adhesive coefficient $\mu$ between the tires and the road surface is smaller than desired and, the wheels may be locked or likely to be locked, the computer means 77 causes current to flow into the solenoid coil 65 of the first electro-magnetic valve assembly 45. Therefore, the plunger 66 is displaced leftwards to close the valve assembly 57 and at the same time to open the valve assembly 58 and accordingly to communicate the chamber 44 with the reservoir 51 via ports 49 and 52 of the first electromagnetic valve assembly 45 and also via the second electromagnetic valve assembly 81.

The two pistons 31 and 42 of the actuator 15 are displaced rightwards by the braking pressure and the ball valve 30 of the valve assembly 25 is moved into contact with the conical surface 27a of the valve seat 27 to interrupt the communication between the ports 22 and 23, thus establishing a circuit from the valve assembly 25 to the wheel brake cylinders 17a, 17a. Since the volume in this circuit is increased due to the sliding movement of the piston 31, the braking pressure in the wheel brake cylinders 17a, 17a is lowered to moderate the braking force, and thus the rotational speed of the wheels 17, 17 can be restored. After restoration of this wheel condition, the computer means 77 again causes a current not to flow into the solenoid coil 65, resulting in closing the valve 58 and opening the valve 57 so as to supply the accumulator pressure into the chamber 44 via the conduit 54, ports 56 and 49 of the first electro-magnetic valve assembly 45, and further, port 43 of the actuator. Accordingly, the pistons 31 and 42 of the actuator 15 are moved leftwards against the braking pressure by the hydraulic pressure in chamber 44, and thus elevating the braking pressure of wheel brake cylinders 17a, 17a. The repetition of this operation at high speed prevents the rear wheels from being locked to thus avoid skid of the wheels.

In case hydraulic pressure as required is not stored in the accumulator 55 due to the failure of the hydraulic circuit or the like, that is, the hydraulic pressure is not supplied to the chamber 44 of the actuator 15, the piston 37 is moved leftwards by the biasing force of the spring 38 against the braking pressure and is in contact with the switch member 34. Thereafter, the piston 37 together with the switch member 34 causes movement of both the piston 31 and the rod 36 to the left. Thus, the ball valve 30 is kept separated from the conical surface 27a of the valve seat 27 even when the braking pressure is applied thereto. Therefore, a normal braking operation can be maintained even if the hydraulic pressure is not produced because of some failure in the hydraulic circuit or the accumulator 55.

In addition, when the valve assembly 25 of the actuator 15 is kept closed for an excessive period due to some failure in the actuator 15, and accordingly the switch member 34 and the rod 37 are also separated from each other for an excessive period, the switch body 35 is actuated to light the alarm lamp 79 so as to inform the driver of this unusual condition.

Next, when in the anti-skid operation, the deceleration operation is unusually continued for a long period, stated in another words, when the skid signal generated in the main circuit 100 is transmitted for an excessive period into the solenoid coil 65, the PNP transistor 160 is conducted to actuate the solenoid coil 88 of he second electro-magnetic valve assembly 81, as described. Therefore, the plunger 87 of the valve assembly 81 is displaced rightwards and the valve head 91 is moved into contact with the valve seat 92. The valve seat 92 also is moved into contact with the housing 82b to interrupt communication between the chamber 84 and the passages 84a and 85.

Thus, communication between the chamber 44 of the actuator 15 and the reservoir 51 is interrupted by the second electro-magnetic valve assembly 81 when a predetermined time is passed after the beginning of the actuation of the solenoid coil 65 of the first electro-magnetic valve assembly 45 and oil leakage of the first electro-magnetic valve assembly 45 can be prevented at the second electro-magnetic valve assembly 81.

Obviously, numerous modifications and variations of the present invention are possible in light of the above teachings. It is therefore to be understood that the invention may be practiced otherwise than as specifically described herein.

What is claimed as new and desired to be secured by Letters Patent of the United States is:

1. An anti-skid brake control system for vehicles comprising:
   a master cylinder generating hydraulic pressure;
   wheel brake cylinders;
   a hydraulic braking circuit connecting said master cylinder with said wheel cylinders;
   means for generating a skid sensing signal;
   a pump powered hydraulic pressure source;
   a reservoir hydraulically connected to said pump powered hydraulic pressure source;
   a cut off valve means interposed between said master cylinder and said wheel brake cylinders within said braking circuit for controlling the hydraulic communication therebetween;
   a hydraulic pressure reducing means interposed between said cut off valve means and wheel brake cylinders within said braking circuit, and including a housing, and a piston member slidably fitted therein and being cooperatively connected to said cut off valve means;
   a first electro-magnetic valve means selectively communicating said pressure reducing means with said pump powered hydraulic pressure source and said reservoir in response to said skid sensing signal; and
   a second electro-magnetic valve means interposed between said first electro-magnetic valve means and said reservoir and operable for interrupting the hydraulic communication therebetween after said first electro-magnetic valve means has been actuated for more than a predetermined period of time.

2. Anti-skid brake control system as set forth in claim 1, wherein said skid sensing signal generating means comprises a delay circuit therein to actuate said second electro-magnetic valve assembly a predetermined time after said first electro-magnetic valve assembly continues to be actuated.

3. Anti-skid brake control system as set forth in claim 2, wherein said skid sensing signal generating means further comprises an alarming circuit including an alarming lamp, and a switch assembly operatively engaged with said piston member of said hydraulic pressure reducing means thereby lighting said alarming lamp a predetermined time after said switch assembly is separated from said piston member of said hydraulic pressure reducing means.

* * * * *